United States Patent [19]

Shimada

[11] Patent Number: 5,710,609
[45] Date of Patent: Jan. 20, 1998

[54] LIQUID CRYSTAL PROJECTION-TYPE DISPLAY DEVICE SPECIFIC LIQUID CRYSTAL LAYER RETARDATION AND TWO ALIGNMENT FILMS HAVING ORIENTATION DIRECTIONS 180 DEGREES DIFFERENT

[75] Inventor: Shinji Shimada, Nara, Japan

[73] Assignee: Sharp Kabushiki Kaisha, Osaka, Japan

[21] Appl. No.: 536,357

[22] Filed: Sep. 29, 1995

[30] Foreign Application Priority Data

Oct. 19, 1994 [JP] Japan ................................. 6-253461

[51] Int. Cl.$^6$ .......................... G02F 1/1337; G02F 1/13
[52] U.S. Cl. ................ 349/126; 349/130; 349/180; 349/181
[58] Field of Search ........................ 359/40, 41, 77, 359/63, 98; 349/126, 130, 179, 180, 181

[56] References Cited

U.S. PATENT DOCUMENTS

| | | |
|---|---|---|
| 3,914,020 | 10/1975 | Helfrich ............................ 359/63 |
| 4,257,682 | 3/1981 | Suzuki et al. ...................... 359/76 |
| 4,582,396 | 4/1986 | Bos et al. ........................... 359/75 |
| 4,848,878 | 7/1989 | Lee et al. ........................... 359/74 |
| 5,024,524 | 6/1991 | Flasck ................................ 359/41 |
| 5,602,662 | 2/1997 | Rosenblatt et al. ............... 349/130 |

FOREIGN PATENT DOCUMENTS

| | | |
|---|---|---|
| 3267916 | 11/1991 | Japan. |
| 41888 | 1/1992 | Japan. |
| WO 82/02960 | 9/1982 | WIPO. |

*Primary Examiner*—William L. Sikes
*Assistant Examiner*—Walter Malinowski
*Attorney, Agent, or Firm*—David G. Conlin; Milton Oliver

[57] ABSTRACT

A liquid crystal electro-optical device comprising: a pair of insulating substrates; an electrode and an alignment film formed in this order on each of the insulating substrates; a liquid crystal layer interposed between the pair of insulating substrates, wherein the alignment film is a film capable of aligning the liquid crystal molecules in the liquid crystal layer perpendicularly with respect to the insulating substrates, and wherein the thickness of the liquid crystal layer is 45 to 70% of the twist pitch of the liquid crystal molecules.

18 Claims, 2 Drawing Sheets

$V \geqq Vth$ $V=0$ $V \geqq Vth$

LIQUID CRYSTAL PROJECTION-TYPE DISPLAY DEVICE SPECIFIC LIQUID CRYSTAL LAYER RETARDATION AND TWO ALIGNMENT FILMS HAVING ORIENTATION DIRECTIONS 180 DEGREES DIFFERENT

BACKGROUND OF THE INVENTION

1. Field of the Invention

The present invention relates to a liquid crystal electro-optical device, a projection-type display device employing the same, and a method for driving these devices. More particularly, it relates to a liquid crystal electro-optical device such as a display device, a data-processing device and others employing the electro-optical properties of a liquid crystal, a projection-type display device employing the same, and a method for driving these devices.

2. Related Art

The most critical problem of widely used conventional twisted nematic type (hereinafter referred to as TN) liquid crystal cells is that the display contrast depends largely on the viewing angle. One of the methods for improving this is to introduce what is known as a π cell (a field effect birefringence-type liquid crystal cell). A π cell comprises, between a pair of substrates, a liquid crystal showing a positive dielectric anisotropy and horizontally aligned so that the orientation directions thereof form an angle of 180° with each other with respect to the substrates. Further, an electric field is kept applied so that the liquid crystal molecules around the center along the direction of the cell thickness are approximately perpendicular to the substrates. This π cell is driven by application of an electric field whose intensity is greater than that of the above electric field so as to allow the liquid crystal molecules near the substrates to stand erect, thereby changing the birefringence index of the liquid crystal layer.

π Cells are proposed by, for example, James L. Fergason, (Japanese Examined Patent Publication No. Hei 4(1992)-1888) and Philip J. Bos et al. (Japanese Published Unexamined Patent Application No. Hei 3(1991)-267916). The proposed π cells have the following structure.

(1) When there is no electric field applied to the liquid crystal layer, the liquid crystal molecules in the vicinity of the substrate surface are arrayed in a direction approximately parallel to the alignment film on the substrate.

(2) The orientation directions of the liquid crystal molecules are different by approximately 180° between the upper and lower substrates. Also, a chiral dopant is added so that the ratio of the thickness of the liquid crystal layer to the twist pitch (d/p) is 1/2.

(3) By applying an electric field to the liquid crystal molecules showing a positive dielectric anisotropy, the liquid crystal molecules are allowed to stand erect so as to be approximately perpendicular to the substrate, thereby loosening the twist and letting the phase difference near to zero to achieve display.

(4) A pair of polarizing plates are provided on both sides of the cell and are disposed so that the directions of the polarized light are perpendicular to each other.

(5) The angle formed by the orientation direction of the liquid crystal molecules in the vicinity of the substrate surface and the polarizing direction of the polarizing plates provided on the back surface of the substrate is adapted to be 45°.

These π cells show a comparatively great contrast. The viewing angle dependency of the contrast along each of the vertical (up and down) and horizontal (right and left) directions of the cell is almost symmetrical.

However, the above-mentioned π cells have the following problems.

(1) The display contrast is low compared with a TN liquid crystal cell.

(2) The driving voltage required for obtaining a high contrast will be very high.

(3) If an electric field is not applied at all, the liquid crystal molecules will be in an orientation state such that the liquid crystal molecules are twisted by 180°, rendering it impossible for the cell to operate as a π cell.

(4) Applying an electric field in an ordinary state generates hysteresis. Accordingly, a state must be maintained in which there is a certain degree of electric field present such that the liquid crystal molecules around the center of the liquid crystal layer are arrayed vertical to the substrate (namely, an electric field whose intensity is greater than the threshold value).

It seems that the above-mentioned problems are caused by the fact that the orientations of the liquid crystal molecules at the substrate surface are not identical to the polarizing axes of the polarizing plates, and the liquid crystal molecules at the substrate surface are not easily driven, so that the birefringence of the liquid crystal molecules at and near the substrate surface remains until a high voltage is applied to the liquid crystal layer.

SUMMARY OF THE INVENTION

The present invention provides a liquid crystal electro-optical device comprising a pair of insulating substrates, an electrode and an alignment film formed in this order on each of the insulating substrates and a liquid crystal layer interposed between the pair of insulating substrates, wherein the alignment film is a film capable of aligning the liquid crystal molecules in the liquid crystal layer perpendicularly with respect to the insulating substrates, and the thickness of the liquid crystal layer is 45 to 70% of the twist pitch of the liquid crystal molecules.

Also, the present invention provides a liquid crystal electro-optical device comprising a pair of insulating substrates, an electrode and an alignment film formed in this order on each of the insulating substrates and a liquid crystal layer interposed between the pair of insulating substrates, wherein the alignment film is a film capable of aligning the liquid crystal molecules in the liquid crystal layer perpendicularly with respect to the insulating substrates, and the pair of alignment films have orientation directions whose angles differ by 180° with each other with respect to the direction of the substrate normal.

In yet another aspect, the present invention provides the above liquid crystal electro-optical device which can be driven by applying to the liquid crystal layer an electric field less than or equal to 1.1 times the electric field providing the maximum transmittance.

In still another aspect, the present invention provides a projection-type display device comprising a light source, a projection lens, and the above liquid crystal electro-optical device.

DESCRIPTION OF THE PREFERRED EMBODIMENTS

Figure 1:
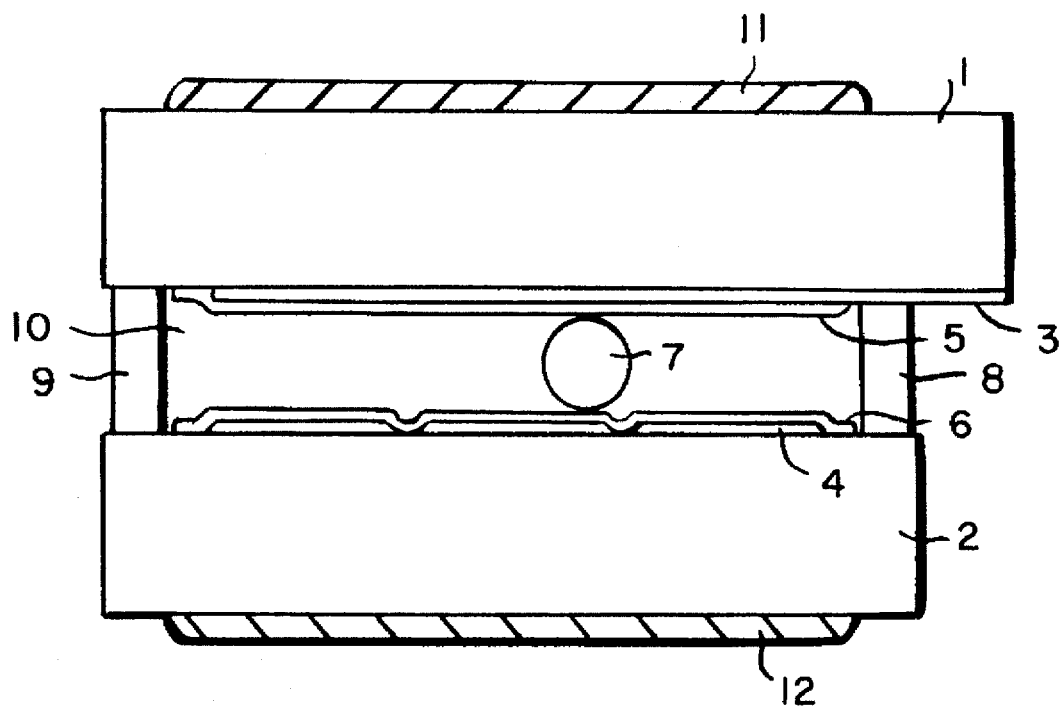
FIG. 1 is a schematic sectional view illustrating a liquid crystal electro-optical device according to the present invention.

The insulating substrate that can be used in the present invention may be any of the conventionally well-known substrates. An example is a substrate made of glass, quartz, ceramic or resin. It is necessary that at least one of the substrates is transparent.

An electrode is formed on the substrate for driving the liquid crystal molecules. When the substrate is transparent, a transparent electrode formed from indium tin oxide, tin oxide, indium oxide or the like is used. When the substrate is opaque, the material for the electrode is not specifically limited, and an opaque electrode formed from aluminum, tantalum, molybdenum, nickel, gold, copper, chromium or the like is used as well as a transparent electrode formed from indium tin oxide, tin oxide, indium oxide or the like. The electrode may be formed by, for example, forming a metal layer by MOCVD (Metal Organic Chemical Vapor Deposition) method, vapor deposition method, sputtering method or the like and then etching the metal layer into a desired shape using a photoresist as a mask.

Next, an alignment film is formed on the insulating substrate on which the above electrode has been formed. Before the alignment film is formed, an insulating film may be optionally formed. Examples of the insulating films include an inorganic insulating film such as $SiO_2$, $SiN_x$, $Al_2O_3$ or $Ta_2O_5$ and an organic insulating film such as a polyimide resin, photoresist resin or polymer liquid crystal. The thickness of the insulating film depends on the material to be used, but may be about 0.1 to 0.2 µm. The insulating film is formed, for example, by the following methods:

(1) An inorganic insulating film may be formed by vapor deposition method, sputtering method, CVD method, solution coating method or the like.

(2) An organic insulating film may be formed by coating the substrate with a polymer-containing solution employing a method such as spinner coating method, immersion coating method, screen printing method or roll printing method, and then drying the substrate to complete the insulating film. Alternatively, an organic insulating film may be formed by coating the substrate with a polymer precursor solution using a method such as above and then curing the coated solution under a predetermined curing condition (such as heating and irradiation with light) to complete the insulating film. Also, Langmuir-Blodgett method may be employed to form an insulating film.

The alignment film that can be used for the present invention is a film that can align the liquid crystal molecules in the liquid crystal layer perpendicularly with respect to the insulating substrate. In other words, the alignment film is a vertical alignment film. Any of the known vertical alignment films having the above properties may be used. For example, a material having a polyimide skeleton bonded with a long-chain alkyl group may be used. More specifically, a polyimide resin such as JALS-203 (manufactured by Nippon Synthetic Rubber, Japan) and SE-7511L (manufactured by Nissan Chemicals Co., Japan) may be used. The thickness of the alignment film is about 0.05 to 0.1 µm. The alignment film may be formed by, for example, coating the substrate with a polymer-containing solution employing a method such as spinner coating method, immersion coating method, screen printing method or roll printing method and then drying the substrate. Alternatively, the alignment film may be formed by coating the substrate with a polymer precursor solution using a method such as above and then curing the solution under a predetermined curing condition (such as heating and irradiation with light). Also, Langmuir-Blodgett method may be employed to form an alignment film.

According to the present invention, a liquid crystal electro-optical device being driven at a low voltage and having a good contrast can be obtained by applying an alignment treatment to the above alignment films and then making the two substrates face each other so that the orientation directions thereof will vary by 180°. Examples of the alignment treatment include rubbing method, ion-beam irradiation and other known methods. A rubbing method is preferable for the mass production of a large-screen liquid crystal electro-optical device. However, the aligning treatment should be applied under a comparatively low rubbing pressure so that the vertical alignment characteristics of the alignment film will not be lost. After the alignment treatment, the insulating substrates are bonded together so that the orientation directions thereof will be opposite to each other as will be described afterwards. In this way, the orientation directions will vary by 180°.

Liquid crystals to be used in the liquid crystal layer of the present invention are not specifically limited but a nematic liquid crystal is preferable. An especially preferable liquid crystal is a nematic liquid crystal having a negative dielectric anisotropy (n-type). For example, ZLI-4788, ZLI-4788-000 (manufactured by Merck Japan) may be used. The thickness of the liquid crystal layer may be preferably 3 to 12 µm.

According to the present invention, a liquid crystal electro-optical device being driven at a low voltage and having a good contrast and an invariable viewing angle dependency along each of the vertical (up and down) and horizontal (right and left) directions can be obtained by adjusting the thickness of the liquid crystal layer to be 45 to 70% of the twist pitch of the liquid crystal molecules. This is because the liquid crystal molecules in the vicinity of the alignment film on the substrate are hardly moved by electric field. It is especially preferable that the thickness of the liquid crystal layer is about 50% of the twist pitch of the liquid crystal molecules, namely, that the twist pitch (p) of the liquid crystal molecules is about twice the thickness (d) of the liquid crystal layer. If the liquid crystal to be used does not satisfy the above relation, a chiral dopant may be added to the liquid crystal to adjust the twist pitch to a desired value.

Any of the known chiral dopants may be used, for example, S-811 (manufactured by Merck Japan) or a cholesteryl nonanoate. If the liquid crystal electro-optical device is to be used in a wide range of temperature, a chiral dopant may be used in which the temperature dependency of the helical twisting power is inverted (that is, opposite to that of S-811). An example of such a chiral dopant is S-1011 (manufactured by Merck Japan).

The intensity I of the transmitted light in a liquid crystal electro-optical device according to the present invention is represented by the following expression:

$$I = I' \sin^2(\pi \Delta n d / \gamma) \quad (1),$$

where I' is the intensity of light transmitted through one polarizing plate, d is the thickness of the liquid crystal layer, $\Delta n$ is the birefringence index of the liquid crystal layer, and $\gamma$ is the wavelength of the light.

In order to obtain the maximum intensity of transmitted light, it is sufficient that the product $\Delta nd$ of the thickness of the liquid crystal layer and the birefringence index of the liquid crystal layer is equal to 1/2, 3/2, 5/2, . . . of the wavelength of the incident light. Among these values, 1/2 is the most preferable for obtaining a broad viewing angle. For example, when a visible light is used, it is sufficient that $\Delta nd$ is 200 to 350 nm, especially 200 to 280 nm because the wavelength of the light is about 400 to 700 nm. Further, in order to obtain a great contrast by slight inclination of the liquid crystal molecules, it is especially preferable that $\Delta nd$ is about one to eight times the inclination of the liquid crystal molecules.

According to the present invention, the most preferable device is a liquid crystal electro-optical device in which the paired insulating substrates face each other so that the orientation directions thereof vary by 180° and in which the thickness of the liquid crystal layer is 45 to 70% of the twist pitch of the liquid crystal molecules, because it can achieve uniform display in white, no induced domains are generated, and a highly uniform orientation state can be obtained in addition to individual effects.

A liquid crystal electro-optical device can be obtained by bonding a pair of insulating substrates on which the electrodes and the alignment films described above are formed so that the alignment films face each other and then interposing a liquid crystal layer between the insulating substrates. One of such methods for interposing a liquid crystal layer is as follows. First, spacers for controlling the thickness of the liquid crystal layer are scattered beforehand on one of the insulating substrates. Next, a sealing resin is coated on portions of the other insulating substrate outside the display region, followed by bonding the insulating substrates together and then injecting a liquid crystal into the space between the substrates. Spacers to be used are not specifically limited and a material such as glass and plastics having a diameter of 1 to 30 μm, preferably 1 to 15 μm may be used.

Further, a pair of polarizing plates may be provided outside the pair of insulating substrates. Preferably, the polarizing plates are disposed so that the polarizing directions thereof are perpendicular to each other. This is for obtaining a greater contrast. When an alignment treatment is applied on the substrates, it is preferable that the orientation direction of the alignment films (namely, the orientation direction of the liquid crystal molecules) and the polarizing direction of the polarizing plates provided outside the insulating substrates form an angle of approximately 45°. Since the aligning treatment uniformly determines the inclination direction of the liquid crystal molecules, the angle of approximately 45° provides the greatest contrast.

Furthermore, the liquid crystal electro-optical device of the present invention can be a reflective optical device. A reflective optical device can be, obtained by further providing a reflection plate outside of one of the polarizing plates or by using one of the electrodes as a reflection plate.

Also, if a color filter is combined, the device will be an optical device capable of displaying colors.

It is preferable to drive the above-described liquid crystal electro-optical device of the present invention by applying to the liquid crystal layer an electric field less than or equal to 1.1 times the electric field providing the maximum transmittance. If the applied electric field is more than 1.1 times the electric field providing the maximum transmittance, the liquid crystal molecules are aligned parallel to the substrates, whereby the liquid crystal molecules are twisted by 180°. This will lead to the hysteresis phenomenon that the transmittance of the liquid crystal layer varies under the same electric field intensity, rendering it difficult to achieve a uniform contrast. If a uniform contrast is not required, it is unnecessary to restrict the driving electric field.

The method for driving a liquid crystal electro-optical device of the present invention is not specifically limited, and a method such as a simple-matrix system or an active-matrix system using an MIM (Metal-Insulator-Metal), a TFT (Thin Film Transistor) may be employed. An amorphous silicon TFT, a polysilicon TFT, a single crystal silicon TFT are all suitable for use as a TFT.

Furthermore, the present invention can also provide a projection-type display device comprising a light source, a projection lens and the liquid crystal electro-optical device as described above. The light source and the projection lens to be used are not specifically limited and those generally used in the field are acceptable for use. If necessary, an optical axis correction lens, a prism, a reflector, a color filter, a dichroic mirror and others may be combined with the device. A plurality of these components constituting the projection-type display device may be provided in the system, so that, naturally, a plurality of liquid crystal electro-optical devices may be used.

As described above, the liquid crystal electro-optical device of the present invention has the following structure. When there is no electric field applied to the liquid crystal layer, the liquid crystal molecules (preferably having a negative dielectric anisotropy) are aligned almost perpendicular to the substrates. When an electric field is applied to the liquid crystal layer, the liquid crystal molecules are aligned almost parallel to the substrates assuming a state which is close to the initial orientation state of a conventional π cell. This structure generates a twist in the liquid crystal layer and enlarges a phase difference, thereby solving the problems found in the prior art.

Such an orientation state can be realized by a method of adding a chiral dopant so that the angle of the twist is about 180° (d/p=1/2) in the neighborhoods of the upper and lower substrate surfaces when the liquid crystal molecules are arrayed parallel to the substrates, or by a method of aligning the alignment films so that the orientation directions thereof vary by 180° between the upper and lower substrates, or by combining these two methods.

It is not necessary to use a conventionally known technique such as a vertical aligning agent like lecithin or oblique vapor deposition of silicon oxide in order to align the liquid crystal molecules almost perpendicularly to the substrates. A polyimide alignment film having a vertical aligning property may be used instead so as to achieve a more stable orientation and to prevent resistance decrease in the liquid crystal layer. Further, by applying to the alignment film an alignment treatment such as a rubbing method, an alignment film consisting of one layer provides the liquid crystal molecules with an orientation slightly tilted with respect to the direction of the substrate normal.

When no electric field is applied to the liquid crystal layer, the liquid crystal molecules remains aligned almost perpendicular to the substrate. Therefore, by providing a pair of polarizing plates outside the pair of substrates so that the polarizing directions thereof form an angle of 90° with each other, the optical rotation and the birefringency of the liquid crystal layer almost completely disappears. In this case, the light is blocked by the polarizing plates and display in black with extremely small light transmittance is achieved.

When an electric field slightly greater than the threshold value of the liquid crystal molecules is applied to the liquid crystal layer, the liquid crystal molecules arrange themselves tilted with respect to the substrate. Being influenced by the chiral dopant added to the liquid crystal layer or by the pretilt angle of the alignment film, the liquid crystal molecules around the center of the liquid crystal layer become tilted in a certain direction. Accordingly, the birefringency of the liquid crystal molecules become larger, allowing the liquid crystal layer to transmit light. This means that it is unnecessary to maintain the electric field applied all the time as in the case of a conventional π cell. Also, since display in black is brought about by the state with no electric field applied to the liquid crystal, a great contrast is obtained with a low driving voltage.

EXAMPLES

The present invention will be described by way of examples shown below but it is not specifically limited thereto.

Example 1

A liquid crystal electro-optical device shown in FIG. 1 according to Example 1 of the present invention was manufactured as follows. In the figure, reference numerals 1 and 2 represent insulating substrates, 3 and 4 electrodes, 5 and 6 vertical alignment films, 7 a spacer, 8 and 9 sealing resin, 10 a liquid crystal layer comprising an n-type nematic liquid crystal to which is added a chiral dopant, and 11 and 12 polarizing plates, respectively.

On a pair of transparent insulating substrates (1, 2) made of glass, electrodes (3, 4) were formed into a predetermined shape out of a transparent conductive film consisting of indium tin oxide.

On the insulating substrates (1, 2) and the electrodes (3, 4), vertical alignment films (5, 8) were coated which were capable of aligning liquid crystal molecules vertically with respect to the substrates. In this example, a vertical alignment film having a polyimide skeleton bonded with a long-chain alkyl group (JALS-203 manufactured by Nippon Synthetic Rubber Co.) was used.

On one of the pair of insulating substrates (1, 2) formed as above, spacers (7) having a diameter of 5 µm were scattered, and on portions of the other insulating substrate outside the display region, a sealing resin (8, 9) was coated, followed by bonding the substrates together to complete a cell.

An n-type nematic liquid crystal to which is added a chiral dopant adjusted so that the twist pitch of the liquid crystal molecules would be 10 µm was injected into the cell. The injection port was then sealed to form a liquid crystal layer (10).

The resultant cell was heated up beyond a temperature at which the liquid crystal becomes an isotropic phase, and was then cooled. In this example, the liquid crystal was ZLI-4788 (manufactured by Merck Japan) and the chiral dopant was S-811 (manufactured by Merck Japan).

On the outside of the cell thus formed, polarizing plates (11, 12) were disposed so that the polarizing directions thereof would be perpendicular to each other, thereby completing a liquid crystal electro-optical device.

Figure 2:
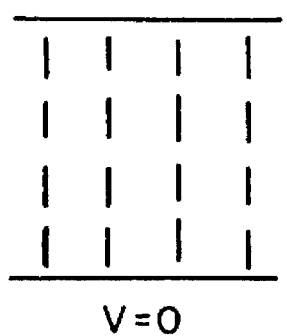
FIG. 2 is a schematic view showing an orientation of the liquid crystal molecules in a liquid crystal electro-optical device according to the present invention when an electric field is not applied.
Figure 3:
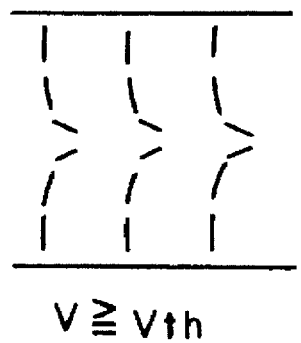
FIG. 3 is a schematic view showing an orientation of the liquid crystal molecules in a liquid crystal electro-optical device according to the present invention when an electric field is applied.

FIG. 2 shows the state of the liquid crystal molecules when there is no electric field applied to the above liquid crystal layer. FIG. 3 shows the state of the liquid crystal molecules when an electric field is applied. It seems that when there is no electric field applied, the liquid crystal molecules are aligned perpendicular to the substrates, whereas when an electric field is applied, the liquid crystal molecules around the center of the layer are aligned tilted with respect to the substrates.

In this example, the intensity I of the transmitted light in a liquid crystal electro-optical device is represented by the following expression:

$$I = I' \sin^2(\pi \Delta n d / \gamma) \quad (1),$$

where I' is the intensity of light transmitted through one polarizing plate, d is the thickness of the liquid crystal layer, Δn is the birefringence index of the liquid crystal layer, and γ is the wavelength of the light. In this example, the product Δnd of the thickness of the liquid crystal layer and the birefringence of the liquid crystal layer was adjusted to be 1/2 of the wavelength of the incident light.

Figure 4:
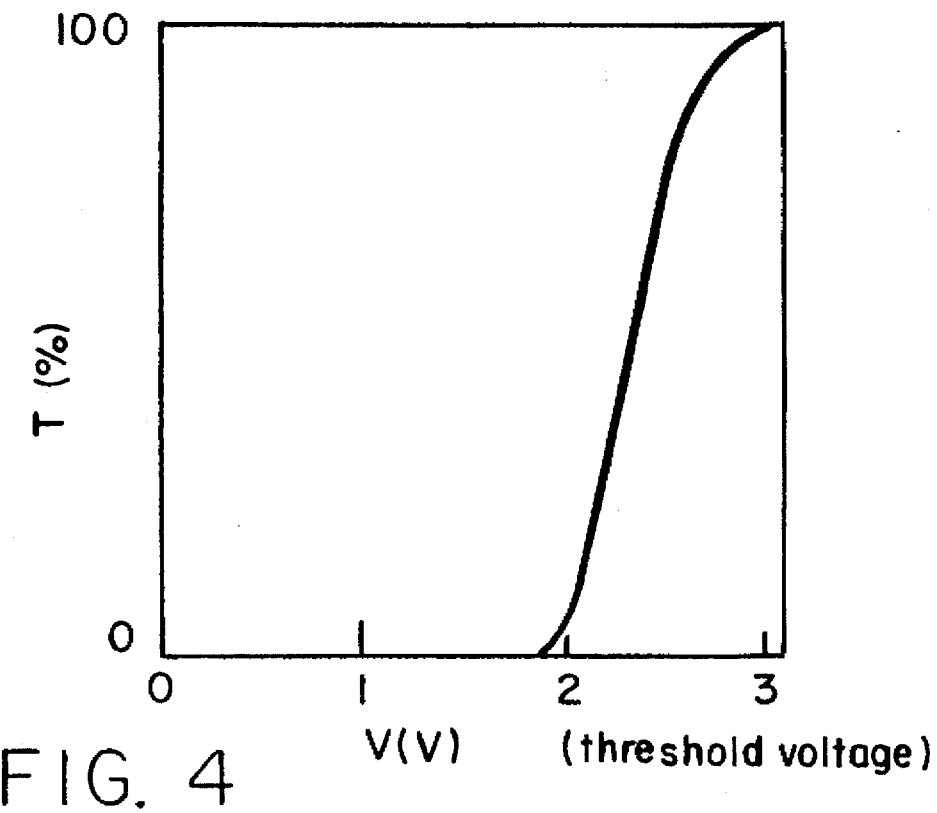
FIG. 4 is a graph showing a voltage-transmittance curve of the liquid crystal electro-optical device according to the present invention.

FIG. 4 shows the voltage-transmittance curve obtained when the liquid crystal electro-optical device thus formed was viewed from the front at an ordinary temperature. The liquid crystal electro-optical device of this example was of a normally black type with a threshold voltage of approximately 2V, and the voltage providing the maximum transmittance was approximately 8V. The contrast ratio was approximately 1000. The transmittance at display in white was almost the same as that obtained by the conventional field effect birefringence-type liquid crystal cell in which the liquid crystal molecules are horizontally aligned.

Moreover, the device of this example had a characteristic that the contrast was invariant along each of the vertical (up and down) and horizontal (right and left) directions. This result shows that the device of this example has properties such as a low driving voltage, a high brightness and a high contrast whose viewing angle dependency is invariant along each of the vertical (up and down) and horizontal (right and left) directions, thus overcoming the disadvantages of a conventional display mode.

When the liquid crystal electro-optical device of this example was driven by an electric field more than 1.1 times the electric field providing the maximum transmittance, the liquid crystal molecules were aligned parallel to the substrates, whereby the liquid crystal molecules in the cell was twisted by 180°. This resulted in what is called a hysteresis phenomenon, a change in transmittance under the same electric field intensity. Therefore it was found out that the driving electric field should preferably be equal to or less than 1.1 times the electric field providing the maximum transmittance.

Example 2

The same manufacturing steps as in Example 1 were employed up to the formation of the vertical alignment film. Then, an alignment treatment was applied so that the orientation directions of the liquid crystal molecules varied by 180° between the paired insulating substrates. A rubbing method was employed as the alignment treatment. After this, cells were formed following the same steps as in Example 1 and a liquid crystal was injected into the cells.

On the outside of the cell thus formed, polarizing plates were disposed so that the polarizing directions thereof were perpendicular to each other and that the orientation direction of the alignment film and the polarizing direction of the polarizing plates formed an angle of 45°, thereby completing a liquid crystal electro-optical device according to Example 2 of the present invention.

Although uniformity of contrast in all the directions of the viewing angle was not observed, the obtained liquid crystal electro-optical device as compared with Example 1 showed an improvement regarding the uniformity of orientation. Accordingly, a good display quality was obtained owing to the liquid crystal molecules with an orientation thereof slightly tilted with respect to the direction of the substrate normal.

Also, it was found out that, due to the same reason as in Example 1, the driving electric field should preferably be equal to or less than 1.1 times the electric field providing the maximum transmittance.

Example 3

A liquid crystal electro-optical device according to Example 3 of the present invention was manufactured by injecting a liquid crystal such as in Example 1 into a cell formed in the same manner as in Example 2.

The obtained liquid crystal electro-optical device had no color irregularities in displaying white, generated no induced domains, and showed an extremely uniform orientation state.

Also, it was found out that, due to the same reason as in Example 1, the driving electric field should preferably be equal to or less than 1.1 times the electric field providing the maximum transmittance.

Example 4

Figure 5:
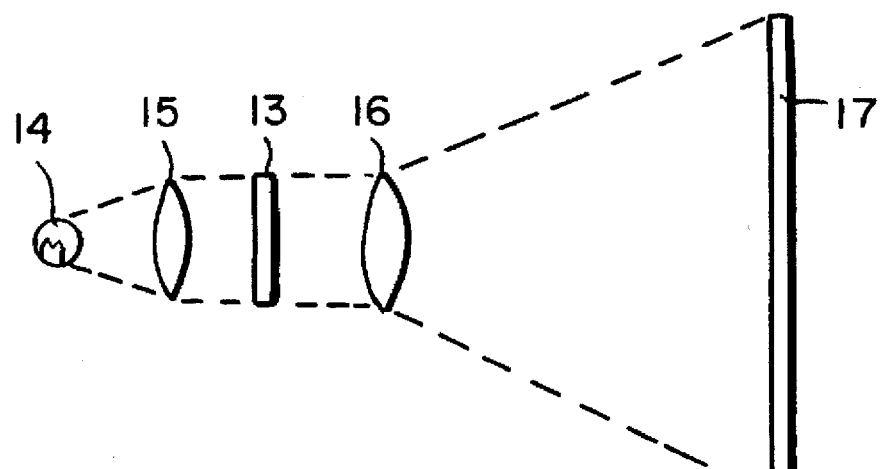
FIG. 5 is a schematic view illustrating a projection-type display device according to the present invention.

A projection display system was obtained as in FIG. 5 by disposing a liquid crystal electro-optical device of Example 1 between an optical axis correction lens and a projection lens, using a light source. In FIG. 5, the reference numeral 13 represents a liquid crystal electro-optical device, 14 a light source, 15 an optical axis correction lens, 16 a projection lens, and 17 a screen. Since a wide viewing angle characteristic is not required in this projection display system, it is possible to make the best use of the properties of the liquid crystal electro-optical device such as a low driving voltage, a high brightness and a high contrast whose viewing angle dependency is invariant along each of the vertical (up and down) and horizontal (right and left) directions.

The liquid crystal electro-optical device of the present invention as described above can be used effectively as a personal-use display device, a data-processing device, a projection-type display device and others because it possesses properties such as a low driving voltage, a high brightness and a high contrast whose viewing angle dependency is invariant along each of the vertical (up and down) and horizontal (right and left) directions. Moreover, since no hysteresis is generated when an electric field is applied in an ordinary state, it is unnecessary to maintain an electric field at all times, which is needed in a liquid crystal device having a conventional π cell. Further, since an existing manufacturing line for the known TN-type liquid crystal display devices can be used as it is, the present invention is advantageous with respect to manufacturing costs and throughputs, thus providing a less expensive liquid crystal electro-optical device.

What is claimed is:

1. A liquid crystal electro-optical device comprising:
a pair of parallel transparent insulating substrates;
an electrode and an alignment film formed in this order on each of the insulating substrates; and
a liquid crystal layer, having a predetermined thickness, interposed between the pair of insulating substrates,
wherein
each alignment film is a film capable of aligning the liquid crystal molecules in the liquid crystal layer perpendicularly with respect to the insulating substrates,
the thickness of the liquid crystal layer is 45 to 70% of the twist pitch of the liquid crystal molecules, and
the product of the thickness of the liquid crystal layer and the birefringence index of the liquid crystal layer is in the range of 200 nm to 350 nm.

2. A device according to claim 1, in which the liquid crystal layer comprises a nematic liquid crystal having negative dielectric anisotropy.

3. A device according to claim 1, in which the liquid crystal layer contains a chiral dopant for generating a twist in the liquid crystal molecules.

4. A liquid crystal electro-optical device according to claim 1, in which the alignment film is a polyimide film.

5. A device according to claim 1, in which a pair of polarizing plates, having polarizing axes perpendicular to each other, are provided outside the pair of insulating substrates.

6. A device according to claim 1, further comprising a voltage source coupled to said electrodes, applying to the liquid crystal layer an electric field providing the maximum transmittance.

7. A projection-type display device comprising a light source, a projection lens, and the liquid crystal electro-optical device of claim 1,
wherein each alignment film is a film capable of aligning the liquid crystal molecules in the liquid crystal layer perpendicularly with respect to the insulating substrates, and
wherein the thickness of the liquid crystal layer is 45 to 70% of the twist pitch of the liquid crystal molecules.

8. A projection-type display device comprising a light source, a projection lens, and the liquid crystal electro-optical device of claim 1,
wherein each alignment film is a film capable of aligning the liquid crystal molecules in the liquid crystal layer perpendicularly with respect to the insulating substrates, and
wherein the pair of alignment films orient molecules of said liquid crystal layer along a line normal to said parallel substrates, in respective orientation directions which differ by 180° with respect to each other.

9. A device according to claim 1, wherein said liquid crystal electro-optical device is a transmittance-type liquid crystal device.

10. A liquid crystal electro-optical device comprising:
a pair of parallel transparent insulating substrates;
an electrode and an alignment film formed in this order on each of the insulating substrates; and
a liquid crystal layer interposed between the pair of insulating substrates,
wherein each alignment film is a film capable of aligning the liquid crystal molecules in the liquid crystal layer perpendicularly with respect to the insulating substrates, and the pair of alignment films orient molecules of said liquid crystal layer along a line normal to said parallel substrates, in respective orientation directions which differ by 180° with respect to each other, and
the product of the thickness of the liquid crystal layer and the birefringence index of the liquid crystal layer is in the range of 200 nm to 350 nm.

11. A device according to claim 10, in which the thickness of the liquid crystal layer is in the range of 45 to 70% of the twist pitch of the liquid crystal molecules.

12. A device according to claim 10, in which the liquid crystal layer comprises a nematic liquid crystal having negative dielectric anisotropy.

13. A device according to claim 10, in which the liquid crystal layer contains a chiral dopant for generating a twist in the liquid crystal molecules.

14. A liquid crystal electro-optical device according to claim 10, in which the alignment film is a polyimide film.

15. A device according to claim 10, in which a pair of polarizing plates, having polarizing axes perpendicular to each other, are provided outside the pair of insulating substrates.

16. A device according to claim 15, in which the orientation direction of the alignment film on each insulating substrate forms an angle of approximately 45° with a polarizing direction of the polarizing plate on the outside surface of the respective adjacent insulating substrate.

17. A device according to claim 10, further comprising a voltage source coupled to said electrodes, applying to the liquid crystal layer an electric field not greater than 1.1 times the electric field providing the maximum transmittance.

18. A device according to claim 10, wherein said liquid crystal electro-optical device is a transmittance-type liquid crystal device.

* * * * *